United States Patent
Seki et al.

(10) Patent No.: US 12,269,948 B2
(45) Date of Patent: Apr. 8, 2025

(54) POLYIMIDE PRECURSOR SOLUTION AND METHOD FOR PRODUCING POROUS POLYIMIDE FILM

(71) Applicant: FUJIFILM Business Innovation Corp., Tokyo (JP)

(72) Inventors: Mieko Seki, Kanagawa (JP); Hidekazu Hirose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 993 days.

(21) Appl. No.: 17/326,364

(22) Filed: May 21, 2021

(65) Prior Publication Data

US 2022/0073743 A1 Mar. 10, 2022

(30) Foreign Application Priority Data

Sep. 9, 2020 (JP) .................. 2020-151436

(51) Int. Cl.
| | |
|---|---|
| C08L 79/08 | (2006.01) |
| C08F 212/08 | (2006.01) |
| C08F 220/18 | (2006.01) |
| C08F 222/10 | (2006.01) |
| C08G 73/10 | (2006.01) |
| C08J 9/28 | (2006.01) |

(52) U.S. Cl.
CPC ............ *C08L 79/08* (2013.01); *C08F 212/08* (2013.01); *C08F 220/1804* (2020.02); *C08F 222/103* (2020.02); *C08G 73/1007* (2013.01); *C08G 73/1067* (2013.01); *C08J 9/28* (2013.01); *C08L 2201/54* (2013.01); *C08L 2205/18* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,938,900 | A | 7/1990 | Moriwaki et al. |
| 2019/0225768 | A1* | 7/2019 | Nukada ............. C08G 73/1067 |

FOREIGN PATENT DOCUMENTS

| | | |
|---|---|---|
| JP | S6397223 | 4/1988 |
| JP | H07171379 | 7/1995 |
| JP | 2005272563 | 10/2005 |
| JP | 2011132390 | 7/2011 |
| JP | 2012224714 | 11/2012 |
| JP | 2016199678 A * | 12/2016 |
| JP | 2019014850 | 1/2019 |
| JP | 2019147870 | 9/2019 |

OTHER PUBLICATIONS

Machine translation of JP 2016199678A (Year: NA).*
"Office Action of Japan Counterpart Application", issued on Jul. 2, 2024, with English translation thereof, p. 1-p. 5.

* cited by examiner

*Primary Examiner* — Rachel Kahn
(74) *Attorney, Agent, or Firm* — JCIPRNET

(57) ABSTRACT

A polyimide precursor solution contains a polyimide precursor, resin particles having a core and a coating resin layer, the coating resin layer contains a melamine resin, and a solvent.

12 Claims, 1 Drawing Sheet

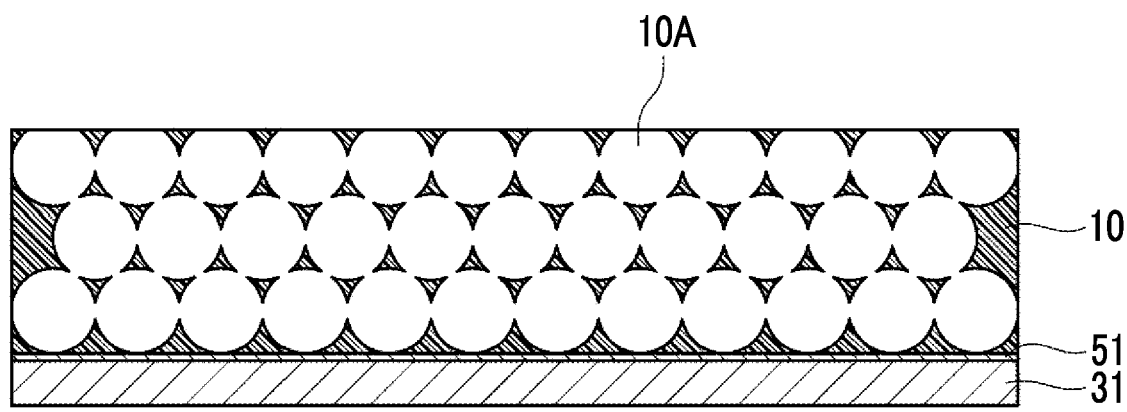

POLYIMIDE PRECURSOR SOLUTION AND METHOD FOR PRODUCING POROUS POLYIMIDE FILM

CROSS-REFERENCE TO RELATED APPLICATIONS

This application is based on and claims priority under 35 USC 119 from Japanese Patent Application No. 2020-151436 filed Sep. 9, 2020.

BACKGROUND

(i) Technical Field

The present invention relates to a polyimide precursor solution and a method for producing a porous polyimide film.

(ii) Related Art

JP2019-147870A discloses acrylic resin fine particles having a calorific value during thermal decomposition in a nitrogen atmosphere measured using a differential thermal analysis curve and an average particle size each within a specific range, and containing a specific content of each of a component derived from an alkyl (meth)acrylate having an alkyl group having 4 or less carbon atoms and a component derived from a polyfunctional (meth)acrylate, in which in a case where $\sigma2$ is a conductivity of a filtered liquid obtained by filtering a dispersion obtained by dispersing 100 parts by weight of the acrylic resin fine particles in 200 parts by weight of ion-exchanged water having a conductivity of at a temperature of 25° C., a difference $\sigma2-\sigma1$ between $\sigma2$ and $\sigma1$ is 1 mS/cm or less.

JP2012-224714A discloses an insulating varnish containing a coating film constituent resin and a thermally decomposable resin that decomposes at a temperature lower than the baking temperature of the coating film constituent resin.

JP2011-132390A discloses a resin composition for forming a porous polyimide containing a polyimide precursor solution and a pore-forming agent, in which the pore-forming agent has a weight-average molecular weight of 1,000 to 2,000,000, is sparingly soluble or insoluble in the polyimide precursor solution, has a temperature of 350° C. or lower at which a mass reduction rate is 50% when heated in a nitrogen-containing atmosphere, has an aspect ratio of 1.0 to 2.0, and has an average particle size of 100 nm to 10 μm.

SUMMARY

A porous polyimide film is obtained by using, for example, a polyimide precursor solution containing a polyimide precursor, resin particles, and a solvent. Specifically, for example, the porous polyimide film is obtained by applying a polyimide precursor solution onto a substrate to form a coating film, drying the coating film to form a film, heating the film to imidize the polyimide precursor, and removing the resin particles in the film. The pore diameter of the porous polyimide film obtained by this method has a size corresponding to the particle size of the resin particles contained in the polyimide precursor solution used.

On the other hand, in the polyimide precursor solution containing the resin particles, the particle size of the resin particles in the polyimide precursor solution may change over time. Examples of the change over time in the particle size of the resin particles include a change due to the dissolution of the surface of the resin particles into the solvent, a change due to the swelling of the resin particles by absorbing the solvent, and a change due to the shrinkage of the resin particles. In a case where the particle size of the resin particles changes over time, it becomes difficult to obtain a porous polyimide film having pores having a target diameter.

Aspects of non-limiting embodiments of the present disclosure relate to a polyimide precursor solution and a method for producing a porous polyimide film that a change in particle size of resin particles over time is suppressed as compared with a case where the polyimide precursor solution contains a polyimide precursor, resin particles including only a core, and a solvent, or a case where the polyimide precursor solution contains a polyimide precursor, resin particles having a swelling degree exceeding 10%, and a solvent.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The following inventions are provided in order to achieve the above object.

According to an aspect of the present disclosure, there is provided a polyimide precursor solution containing:
  a polyimide precursor;
  resin particles having a core and a coating resin layer, the coating resin layer containing a melamine resin; and
  a solvent.

BRIEF DESCRIPTION OF THE DRAWINGS

Exemplary embodiment(s) of the present invention will be described in detail based on the following FIGURES, wherein:

FIG. 1 is a schematic view showing a form of a porous polyimide film obtained by using a polyimide precursor solution of the present exemplary embodiment.

DETAILED DESCRIPTION

Hereinafter, exemplary embodiments of the present invention will be described in detail.
Polyimide Precursor Solution
First Aspect A polyimide precursor solution according to the first aspect contains a polyimide precursor, resin particles having a core and a coating resin layer, the coating resin layer containing a melamine resin, and a solvent.

Since the polyimide precursor solution according to the first aspect has the above configuration, a change in the particle size of the resin particles over time is suppressed as compared to a case where the polyimide precursor solution contains a polyimide precursor, resin particles including only a core, and a solvent. The reason is not clear, but it is presumed as follows.

In a polyimide precursor solution containing resin particles, the particle size of the resin particles in the polyimide precursor solution may change over time.

Specifically, in a case where the solvent contained in the polyimide precursor solution dissolves the resin contained in the resin particles, the surface of the resin particles may dissolve in the solvent with time, and the particle size of the resin particles may become smaller over time. Further, for example, in a case where the degree of crosslinking of the resin contained in the resin particles is low and the affinity between the solvent contained in the polyimide precursor solution and the resin contained in the resin particles is high, the resin particles may swell with time due to absorption of the solvent, and the particle size of the resin particles may increase over time. Further, for example, especially when the resin particles contain a crosslinked resin and the degree of crosslinking is increased by using a polyfunctional monomer in the resin particles at a high concentration, the resin particles shrink in the solvent with time and the particle size of the resin particles may decrease over time because the curing shrinkage increases and the curing shrinkage progresses over time.

In a case where the particle size of the resin particles in the polyimide precursor solution changes over time, it becomes difficult to obtain a porous polyimide film having pores having a target diameter.

On the other hand, in the first aspect, the resin particles have a coating resin layer containing a melamine resin. That is, the surface of the resin particles that come into contact with the solvent is coated with a melamine resin that is difficult to elute into the solvent and has high hardness. Therefore, regardless of whether the resin contained in the core is a resin that is easily eluted into a solvent, a resin that has a low degree of crosslinking and a high affinity with the solvent, or a resin that has a high degree of crosslinking, elution, swelling, and shrinkage of the resin particles are less likely to occur, and the change in the particle size of the resin particles over time is thus expected to be suppressed.

In the first aspect, since the resin particles have the coating resin layer containing the melamine resin, the shape of the pores is less likely to collapse in the process of obtaining the porous polyimide film. The reason is unclear, but it is presumed that the high thermal decomposition temperature of the melamine resin causes the coating resin layer to undergo thermal decomposition after the core is first melted and decomposed by heat in a case where the resin particles are removed by heating, and imidization of the polyimide precursor occurs while the shape of the pores is maintained.

Further, in the first aspect, since the resin particles have a coating resin layer containing a melamine resin, the dispersibility of the resin particles in the polyimide precursor solution is improved. The reason is unclear, but it is presumed that the high hardness of the melamine resin lowers the adhesion of the surface of the resin particles and makes it difficult for the resin particles to aggregate with each other.

Second Aspect

The polyimide precursor solution according to the second aspect contains a polyimide precursor, resin particles having a swelling degree within ±10% after immersion in methanol, and a solvent.

Here, the swelling degree is calculated from the following formula by measuring the particle size under an optical microscope when the particles are placed in water and methanol for 1 hour at room temperature (25° C.). The average particle size is a number average value of particle sizes obtained by measuring ten resin particles to be measured using an optical microscope as a measuring device.

When the average particle size of the resin particles in water is D0 and the average particle size of the resin particles in methanol is D1, the swelling degree is obtained by the following equation.

Swelling degree (%)=((D1−D0)/D0)×100    Equation:

Since the polyimide precursor solution according to the second aspect has the above configuration, the change in the particle size of the resin particles over time is suppressed as compared with the case where a polyimide precursor, resin particles having a swelling degree exceeding 10%, and a solvent are contained.

As described above, in the polyimide precursor solution containing the resin particles, the particle size of the resin particles in the polyimide precursor solution may change over time.

On the other hand, in the second aspect, as the resin particles, resin particles having a swelling degree within ±10% after immersion in methanol for 1 hour are used. The resin particles having a swelling degree within ±10% after immersion in methanol for 1 hour have a property of hardly absorbing a solvent, so it is presumed that the resin particles hardly absorb a solvent even in the polyimide precursor solution, and a change in the particle size of the resin particles over time is suppressed.

Hereinafter, the polyimide precursor solution corresponding to both the polyimide precursor solution according to the first aspect and the polyimide precursor solution according to the second aspect will be referred to as "polyimide precursor solution according to the present exemplary embodiment". However, an example of the polyimide precursor solution of the present invention may be any polyimide precursor solution corresponding to at least one of the polyimide precursor solution according to the first aspect and the polyimide precursor solution according to the second aspect.

Polyimide Precursor

The polyimide precursor solution of the present exemplary embodiment contains a polyimide precursor.

The polyimide precursor is a resin (polyimide precursor) having a repeating unit represented by the general formula (I).

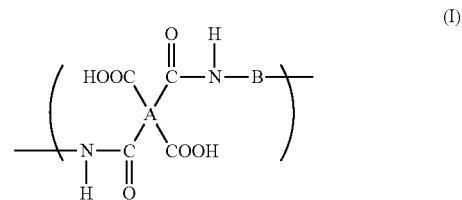

(In the general formula (I), A represents a tetravalent organic group and B represents a divalent organic group.)

Here, in the general formula (I), the tetravalent organic group represented by A is a residue obtained by removing four carboxyl groups from the tetracarboxylic dianhydride used as a raw material.

On the other hand, the divalent organic group represented by B is a residue obtained by removing two amino groups from the diamine compound used as a raw material.

That is, the polyimide precursor having a repeating unit represented by the general formula (I) is a polymer of a tetracarboxylic dianhydride and a diamine compound.

Examples of the tetracarboxylic dianhydride include both aromatic and aliphatic compounds thereof, and preferred are aromatic compounds thereof, for example. That is, in the general formula (I), the tetravalent organic group represented by A is, for example, preferably an aromatic organic group.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furanetetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropyridene diphthalic dianhydride, 3,3',4,4'-biphenyltetracarboxylic dianhydride, 2,3,3',4'-biphenyltetracarboxylic dianhydride, bis(phthalic) phenylphosphine oxide dianhydride, p-phenylene-bis(triphenylphthalic)dianhydride, m-Phenylene-bis(triphenylphthalic)dianhydride, bis(triphenylphthalic)-4,4'-diphenyl ether dianhydride, and bis(triphenylphthalic)-4,4'-diphenylmethane dianhydride.

Examples of the aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-di carboxylic dianhydride, and bicyclo[2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione; and the like.

Among these, the tetracarboxylic dianhydride is, for example, may be, for example, an aromatic tetracarboxylic dianhydride, and specifically, may be, for example, pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, and 3,3',4,4'-benzophenonetetracarboxylic dianhydride, pyromellitic dianhydride, 3,3',4,4'-biphenyltetracarboxylic dianhydride, and 3,3',4,4'-benzophenonetetracarboxylic dianhydride, and in particular, may be 3,3',4,4'-biphenyltetracarboxylic dianhydride.

The tetracarboxylic dianhydride may be used alone or in combination of two or more kinds thereof.

In addition, in a case of the combination use of two or more kinds thereof, the aromatic tetracarboxylic dianhydride or the aliphatic tetracarboxylic acid may be used in combination, or the aromatic tetracarboxylic dianhydride and the aliphatic tetracarboxylic dianhydride may be combined to be used.

On the other hand, the diamine compound is a diamine compound having two amino groups in the molecular structure. Examples of the diamine compound include both aromatic and aliphatic compounds thereof, and preferred are aromatic compounds thereof, for example. That is, in the general formula (I), the divalent organic group represented by B is, for example, preferably an aromatic organic group.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and hetero atoms other than nitrogen atoms of the amino groups such as diaminotetraphenyl thiophene; and aliphatic and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1, 0$^{2.7}$]-undecylene dimethyldiamine, and 4,4'-methylenebis(cyclohexylamine).

Among these, the diamine compound may be, for example, an aromatic diamine compound, specifically, may be p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone, and in particular, may be 4,4'-diaminodiphenyl ether, and p-phenylenediamine.

The diamine compound may be used alone or in combination of two or more kinds thereof. In addition, in a case of the combination use of two or more kinds thereof, aromatic diamine compounds or aliphatic diamine compounds may be used in combination, or aromatic diamine compounds and aliphatic diamine compounds may be combined to be used.

The weight-average molecular weight of the polyimide precursor used in the present exemplary embodiment is, for example, preferably 5000 or more and 300,000 or less, and more preferably 10,000 or more and 150,000 or less.

The weight-average molecular weight of the polyimide precursor is measured by a gel permeation chromatography (GPC) method under the following measurement conditions.

Column: Tosoh TSK gel α-M (7.8 mm I.D×30 cm)
Eluent: DMF (dimethylformamide)/30 mM LiBr/60 mM phosphoric acid
Flow rate: 0.6 mL/min
Injection volume: 60 μL
Detector: RI (differential refractive index detector)

The content of the polyimide precursor contained in the polyimide precursor solution according to the present exemplary embodiment is, for example, 0.1% by mass or more and 40% by mass or less, and preferably 1% by mass or more and 25% by mass or less with respect to the total mass of the polyimide precursor solution.

Resin Particles

The polyimide precursor solution of the present exemplary embodiment contains resin particles.

The resin particles are preferably resin particles having, for example, a core and a coating resin layer that coats the surface of the core. Further, the coating resin layer preferably contains, for example, a melamine resin.

Hereinafter, as an example of the resin particles, resin particles having a core and a coating resin layer and in which the coating resin layer contains a melamine resin will be described.

Core

Examples of the core include particles made of a resin other than polyimide. Further, the core is preferably particles made of a resin other than the melamine resin, for example. Specific examples of the core include particles obtained by polycondensation of a polymerizable monomer such as a polyester resin and a urethane resin, and particles obtained by radical polymerization of a polymerizable monomer such as a vinyl resin, an olefin resin, and a fluororesin. Examples of the particles obtained by radical polymerization include particles of a (meth)acrylic resin, a (meth)acrylate resin, a styrene/(meth)acrylic resin, a polystyrene resin, and a polyethylene resin.

Among these, the core is preferably, for example, resin particles obtained by radical polymerization from the viewpoint of ease of production. Further, the core preferably contains, for example, a vinyl resin from the viewpoint of ease of production.

Further, the core more preferably contains, for example, at least one selected from the group consisting of a polystyrene resin, a (meth)acrylic resin, a (meth)acrylate resin, and a styrene-(meth)acrylate resin (hereinafter, also referred to as "specific resin") among vinyl resins from the viewpoint of ease of production. The specific resin is excellent in production suitability, but easily absorbs a solvent (particularly a solvent containing an organic solvent). However, it is considered that even in a case where the core contains the specific resin, by covering the core with a coating resin layer containing a melamine resin, the swelling of the resin particles in the polyimide precursor solution is suppressed, and the change in the particle size of the resin particles over time is suppressed.

In the present exemplary embodiment, the term "(meth) acrylic" means to include both "acrylic" and "methacrylic".

In a case where the core is a particle containing a vinyl resin, the core is obtained by polymerizing a monomer. Examples of the vinyl resin monomer include styrenes having a styrene skeleton such as styrene, an alkyl-substituted styrene (for example, α-methylstyrene, 2-methylstyrene, 3-methylstyrene, 4-methylstyrene, 2-ethylstyrene, 3-ethylstyrene, or 4-ethylstyrene), a halogen-substituted styrene (for example, 2-chlorostyrene, 3-chlorostyrene, or 4-chlorostyrene), or vinylnaphthalene; esters such as methyl (meth)acrylate, ethyl (meth)acrylate, n-propyl (meth)acrylate, n-butyl (meth)acrylate, lauryl (meth)acrylate, 2-ethylhexyl (meth)acrylate, or trimethylolpropane trimethacrylate (TMPTMA); vinyl nitriles such as acrylonitrile or methacrylonitrile; vinyl ethers such as vinyl methyl ether or vinyl isobutyl ether; vinyl ketones such as vinyl methyl ketone, vinyl ethyl ketone or vinyl isopropenyl ketone; acids such as (meth)acrylic acid, maleic acid, cinnamic acid, fumaric acid, or vinylsulfonic acid; bases such as ethyleneimine, vinylpyridine, or vinylamine; and other monomers.

The vinyl resin may be a resin which is obtained using one monomer among these monomers, or may be a copolymer which is obtained using two or more monomers among these monomers.

The vinyl resin may be polymerized by using a monofunctional monomer such as vinyl acetate, a bifunctional monomer such as ethylene glycol dimethacrylate, nonane diacrylate, or decanediol diacrylate, or a polyfunctional monomer such as trimethylolpropane triacrylate or trimethylolpropane trimethacrylate in combination as another monomer.

In a case where the core is a particle containing a vinyl resin and the monomer used for polymerization of the vinyl resin contains styrene, the ratio of styrene in the total monomer components is, for example, preferably 20% by mass or more and 100% by mass or less, and more preferably 40% by mass or more and 100% by mass or less.

The resin contained in the core may be used alone or in combination of two or more.

The core may contain a crosslinked resin or may be made of an uncrosslinked resin.

In a case where the core is a particle containing a vinyl resin, for example, by using a bifunctional monomer and a polyfunctional monomer in combination as monomers, a particle containing a crosslinked resin can be obtained.

It is considered that even in a case where the core contains a crosslinked resin, by covering the core with a coating resin layer containing a melamine resin, the shrinkage of the resin particles in the polyimide precursor solution is suppressed, and the change in the particle size of the resin particles over time is suppressed. Further, it is considered that even in a case where the core is made of a uncrosslinked resin, by covering the core with a coating resin layer containing a melamine resin, the elution and swelling of the resin particles in the polyimide precursor solution are suppressed, and the change in the particle size of the resin particles over time is suppressed.

From the viewpoint of preventing the pores from collapsing in the process of obtaining the porous polyimide film, for example, the resin contained in the core preferably has a lower melting point than the melamine resin. Further, from the viewpoint of preventing the pores from collapsing in the process of obtaining the porous polyimide film, the core is preferably made of, for example, an uncrosslinked resin.

The core preferably contains, for example, a resin containing a hydroxyl group. In a case where the resin containing a hydroxyl group is contained in the core of the resin particles, the change in the particle size of the resin particles over time is further suppressed. The reason is not clear, but it is considered to be caused by the reaction between the hydroxyl groups of the resin contained in the core and the melamine resin contained in the coating resin layer. Specifically, it is presumed that the stability of the core-shell structure of the resin particles is improved by the adhesion of the coating resin layer to the core by the above reaction, and the elution, swelling and shrinkage of the resin particles over time are less likely to occur.

Specific examples of the resin containing a hydroxyl group contained in the core include at least one selected from the group consisting of a polystyrene resin, a (meth) acrylic resin, a (meth)acrylate resin, and a styrene-(meth) acrylic resin.

In a case where the resin containing a hydroxyl group is a vinyl resin, the vinyl resin can be obtained, for example, by polymerizing a monomer having a hydroxyl group and a monomer having no hydroxyl group.

Examples of the monomer having a hydroxyl group include the vinyl resin monomer to which a hydroxyl group is bonded. Specific examples of the monomer having a hydroxyl group include hydroxystyrene, (meth)acrylic acid, hydroxymethyl (meth)acrylate, hydroxyethyl (meth)acrylate, hydroxy n-propyl (meth)acrylate, hydroxy n-butyl (meth)acrylate, hydroxy lauryl (meth)acrylate, and one terminal (meth)acrylic acid adduct of an alkyloxyoligoethylene glycol such as tetraethylene glycol monomethyl ether (meth)acrylate.

In a case where the core is a particle containing a hydroxyl group-containing vinyl resin and a monomer having a hydroxyl group and a monomer having no hydroxyl group are used for polymerization of the hydroxyl group-containing vinyl resin, the ratio of the hydroxyl group-containing monomer in the total monomer components is, for example, preferably 0.1% by mass or more and 70% by mass or less, more preferably 1% by mass or more and 50% by mass or less, and still more preferably 3% by mass or more and 30% by mass or less.

Coating Resin Layer

The coating resin layer contains at least a melamine resin, and may contain other resins as necessary. However, the content of the melamine resin with respect to the entire coating resin layer is, for example, preferably 90% by mass or more, more preferably 95% by mass or more, still more preferably 98% by mass or more, and particularly preferably 100% by mass.

Examples of the melamine resin include a resin obtained by crosslinking a compound having a melamine structure.

Specific examples of the compound having a melamine structure include a compound represented by the following general formula (β).

The compound represented by the following general formula (β) can be obtained by synthesizing, for example, melamine and formaldehyde by a known method (see, for example, Experimental Chemistry Course 4th Edition, Vol. 28, p. 430).

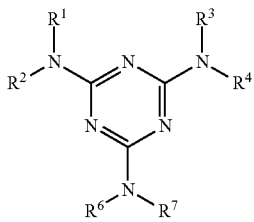

General Formula (β)

In general formula (β), $R^1$, $R^2$, $R^3$, $R^4$, $R^6$, and $R^7$ each independently represent an —H, —CH$_2$OH, or alkyloxymethyl group.

Specific examples of the compound represented by the general formula (β) include compounds having a structure represented by the following (β)-1 to (β)-6. These may be used alone or in admixture of two or more.

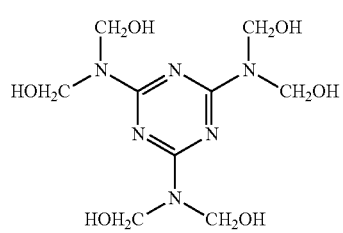

(β)-1

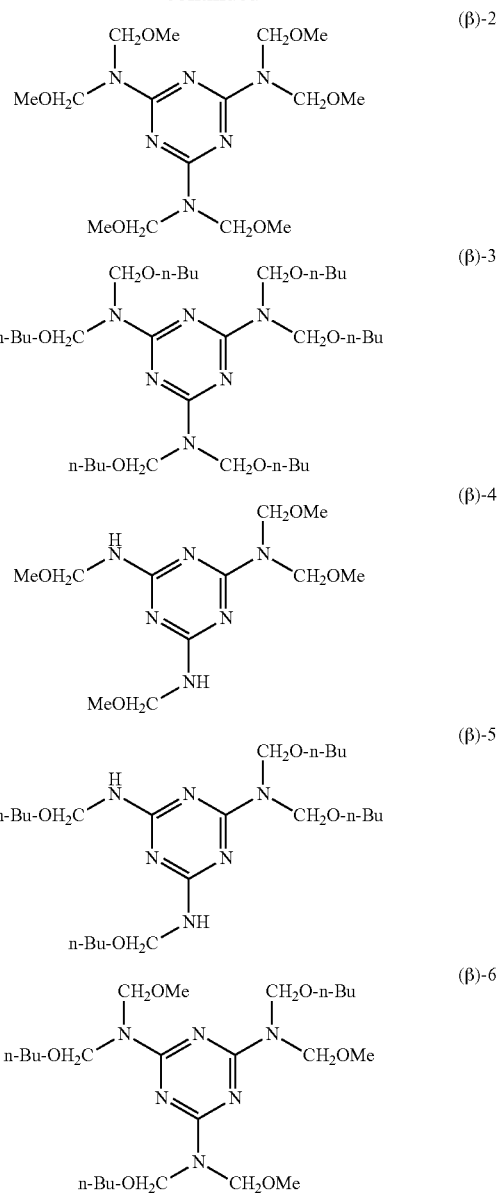

The ratio of the coating resin layer with respect to all of the resin particles is, for example, in the range of 0.1% by mass or more and 50% by mass or less, more preferably in the range of 1% by mass or more and 30% by mass or less, and still more preferably in the range of 10% by mass or more and 20% by mass or less.

In a case where the ratio of the coating resin layer is in the above range, the change in the particle size of the resin particles over time is suppressed as compared to the case where the ratio is lower than the above range. Further, in a case where the ratio of the coating resin layer is in the above range, the resin particles are removed at a lower temperature in the process of producing the porous polyimide film as compared to the case where the ratio is higher than the above range, and thus the production suitability of the porous polyimide film is good.

Characteristics of Resin Particles

The shape of the resin particles may be, for example, spherical.

In a case where the resin particles are removed from the polyimide film using the spherical resin particles to prepare a porous polyimide film, a porous polyimide film having spherical pores can be obtained.

The term "spherical" in the particle encompasses both spherical and substantially spherical (a shape close to a spherical shape) shapes. Specifically, the term "spherical" means that the ratio of particles having a major axis to minor axis ratio (major axis/minor axis) of 1 or more and less than 1.5 is more than 80%. The ratio of particles having a major axis to minor axis ratio (major axis/minor axis) of 1 or more and less than 1.5 is, for example, preferably 90% or more. The closer the major axis to minor axis ratio approaches 1, the more spherical the particles become.

The glass transition temperature of the resin particles is, for example, 60° C. or higher, and is, for example, preferably 70° C. or higher, and more preferably 80° C. or higher, from the viewpoint of maintaining the shape of the particles in the process of producing the polyimide precursor solution and in the process of applying the polyimide precursor solution and drying the coating film (before removing the resin particles) in producing the porous polyimide film.

The glass transition temperature is determined from a DSC curve obtained by differential scanning calorimetry (DSC), and more specifically, it is determined by the method of determining the glass transition temperature described in JIS K 7121:1987 "Method for measuring transition temperature of plastic" "extrapolated glass transition onset temperature".

The volume-average particle size $D50v$ of the resin particles is not particularly limited, and examples thereof include a range of 0.05 μm or more and 100 μm or less. The lower limit of the volume-average particle size $D50v$ of the resin particles may be 0.1 μm or more, 0.2 μm or more, 0.3 μm or more, 0.4 μm or more, or 0.5 μm or more. Further, the volume-average particle size $D50v$ of the resin particles may be 50 μm or less, 30 μm or less, 10 μm or less, or 5 μm or less.

The volume particle size distribution index (GSDv) of the resin particles is, for example, preferably 1.30 or less, more preferably 1.25 or less, and most preferably 1.20 or less.

The particle size distribution of the resin particles in the polyimide precursor solution according to the present exemplary embodiment is measured by the following method.

The polyimide precursor solution to be measured is diluted and the particle size distribution of the resin particles in the liquid is measured using Coulter counter LS13 (manufactured by Beckman Coulter, Inc.). Based on the measured particle size distribution, the volume cumulative distribution is drawn from the small diameter side with respect to the divided particle size range (channel) to measure the particle size distribution.

In the volume cumulative distribution drawn from the small diameter side, the particle size with a cumulative total of 16% is defined as the volume particle size $D16v$, the particle size with a cumulative total 50% is defined as the volume-average particle size $D50v$, and the particle size with a cumulative total 84% is defined as the volume particle size $D84v$.

Then, the volume particle size distribution index (GSDv) of the particles is calculated as $(D84v/D16v)^{1/2}$ from the particle size distribution obtained by the above method.

In a case where the particle size distribution of the resin particles in the polyimide precursor solution according to the present exemplary embodiment is difficult to measure by the above method, the particle size distribution may be measured by a method such as a dynamic light scattering method.

The content of the resin particles may be determined in accordance with the application of the porous polyimide film, and is, for example, preferably 0.1% by mass or more and 20% by mass or less, more preferably 0.5% by mass or more and 20% by mass or less, and still more preferably 1% by mass or more and 20% by mass or less, with respect to the total mass of the polyimide precursor solution.

The swelling degree after immersing the resin particles in methanol for 1 hour is, for example, preferably ±10% or less, more preferably −7% or more and +7% or less, and still more preferably −5% or more and +5% or less.

In a case where the swelling degree is in the above range, the change in the particle size of the resin particles over time is suppressed as compared to the case where the swelling degree is larger than the above range. A negative value of the degree of swelling indicates that at least one of elution and shrinkage of the resin particles occurs in methanol.

The resin particles preferably have the swelling degree in the above range and are made of, for example, a resin of which core is not crosslinked.

Method for Producing Resin Particles

Examples of the method for producing resin particles include a method having a step of producing a core and a step of coating a surface of the obtained core with a melamine resin.

Examples of the method for producing the core include a method for producing the core by a known polymerization method (radical polymerization such as emulsion polymerization, soap-free emulsion polymerization, suspension polymerization, miniemulsion polymerization, and microemulsion polymerization).

For example, in a case where an emulsion polymerization method is applied to the production of a core containing a vinyl resin, a vinyl resin core is obtained by adding a monomer having a vinyl group such as styrenes or (meth) acrylic acids to water in which a water-soluble polymerization initiator such as potassium persulfate or ammonium persulfate is dissolved, optionally further adding a surfactant such as sodium dodecyl sulfate or diphenyl oxide disulfonate, and performing polymerization by heating with stirring.

Examples of the method for coating the surface of the core with a melamine resin include a method of adding the compound having a melamine structure described above to a dispersion containing particles of the core and heating the dispersion. Examples of the heating temperature include a range of 50° C. or more and 100° C. or less, and examples of the heating time include a range of 1 hour or more and 5 hours or less. Further, the pH of the dispersion during heating includes, for example, a range of 3 or more and 9 or less.

Solvent

The polyimide precursor solution according to the present exemplary embodiment contains a solvent.

The solvent may be an aqueous solvent containing 50% by mass or more of water with respect to the entire solvent, or an organic solvent containing 50% by mass or more of an organic solvent with respect to the whole solvent. Further, the aqueous solvent may contain an organic solvent.

Solvents containing organic solvents (particularly organic solvents) are prone to elution, swelling, and shrinkage of resin particles. However, in the present exemplary embodiment, since the resin particles have the coating resin layer containing a melamine resin, even in a case where a solvent containing an organic solvent (for example, an organic solvent) is used as the solvent, a change in the particle size of the resin particles over time is suppressed.

Further, in the present exemplary embodiment, since the resin particles have the coating resin layer containing a melamine resin, even in a case where an aqueous solvent is used as the solvent, a change in the particle size of the resin particles over time is suppressed as compared to a case where the resin particles do not have the coating resin layer. Furthermore, in a case where an aqueous solvent is used as the solvent, it is necessary to increase the amount of heat given in the production process of the porous polyimide film. On the other hand, in a case where the amount of heat is large, the shape of the pores tends to collapse due to shrinkage of the polyimide. However, in the present exemplary embodiment, since the resin particle has the coating resin layer containing a melamine resin, the coating resin layer is thermally decomposed after the core is first melted and decomposed, and thus the shape of the pores is easily maintained.

Aqueous Solvent

The aqueous solvent contains water.

Examples of water include distilled water, ion-exchanged water, deionized water, ultrafiltered water, and pure water.

The aqueous solvent may contain a water-soluble organic solvent in addition to water. Here, water-soluble means that at 25° C., the target substance dissolves in water by 1% by mass or more.

The content of water with respect to the entire aqueous solvent is, for example, preferably 50% by mass or more and 100% by mass or less, more preferably 70% by mass or more and 100% by mass or less, and still more preferably 80% by mass or more and 100% by mass or less. In a case where the water content is in the above range, elution, swelling, and shrinkage of the resin particles are less likely to occur as compared to the case where the water content is less than the above range, and the change in the particle size of the resin particles over time is suppressed.

Organic Amine Compound

The aqueous solvent preferably contains, for example, an organic amine compound as one of the water-soluble organic solvents.

The organic amine compound is a compound which amine-chlorinates the polyimide precursor (carboxyl group of the polyimide precursor) and enhances the solubility thereof in an aqueous solvent and also functions as an imidization accelerator. Specifically, the organic amine compound may be, for example, an amine compound having a molecular weight of 170 or less. The organic amine compound is a compound other than diamine compound, which is a raw material of the polyimide precursor.

The organic amine compound may be, for example, a water-soluble compound. Water-soluble means that at 25° C., the target substance dissolves in water by 1% by mass or more.

Examples of the organic amine compound include a primary amine compound, a secondary amine compound, and a tertiary amine compound.

Among these, the organic amine compound may be, for example, at least one selected from a secondary amine compound or a tertiary amine compound (particularly, a tertiary amine compound). In a case where a tertiary amine compound or a secondary amine compound is applied as the organic amine compound (particularly, the tertiary amine compound), the solubility of the polyimide precursor in the solvent is easily increased, the film-forming property is easily improved, and the storage stability of the polyimide precursor solution is easily improved.

In addition to monovalent amine compounds, examples of organic amine compounds include divalent or higher polyvalent amine compounds. In a case where a polyvalent amine compound of divalent or higher is applied, a pseudo-crosslinked structure is easily formed between the molecules of the polyimide precursor, and the storage stability of the polyimide precursor solution is easily improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino)ethanol, and morpholine.

Examples of the tertiary amine compound include 2-dimethylaminoethanol, 2-diethylaminoethanol, 2-dimethylaminopropanol, pyridine, triethylamine, picoline, N-alkylmorpholine (for example, N-methylmorpholine, N-ethylmorpholine), 1,2-dimethylimidazole, 2-ethyl-4-methylimidazole, and N-alkylpiperidine (for example, N-methylpiperidine, N-ethylpiperidine).

Among these, for example, a tertiary amine compound is preferable, N-alkylmorpholine is more preferable, and N-methylmorpholine is particularly preferable.

The organic amine compounds may be used alone or in combination of two or more kinds thereof.

The content of the organic amine compound is, for example, preferably 40 parts by mass or more and 100 parts by mass or less, more preferably 45 parts by mass or more and 90 parts by mass or less, and still more preferably 50 parts by mass or more and 80 parts by mass or less, with respect to 100 parts by mass of the polyimide precursor.

Other Water-Soluble Organic Solvents

Examples of other water-soluble organic solvents include aprotic polar solvents, water-soluble ether-based solvents, water-soluble ketone-based solvents, and water-soluble alcohol-based solvents.

Examples of the aprotic polar solvent include N-methyl-2-pyrrolidone (NMP), N,N-dimethylformamide (DMF), 1,3-dimethyl-2-imidazolidinone (DMI), N,N-dimethylacetamide (DMAc), N,N-diethylacetamide (DEAc), dimethyl sulfoxide (DMSO), hexamethylene phosphoramide (HMPA), N-methylcaprolactam, N-acetyl-2-pyrrolidone, and 1,3-dimethyl-imidazolidone.

The water-soluble ether-based solvent is a water-soluble solvent having an ether bond in one molecule.

Examples of the water-soluble ether-based solvent include tetrahydrofuran (THF), dioxane, trioxane, 1,2-dimethoxyethane, diethylene glycol dimethyl ether, and diethylene glycol diethyl ether. Among these, the water-soluble ether-based solvent is, for example, preferably tetrahydrofuran or dioxane.

The water-soluble ketone-based solvent is a water-soluble solvent having a ketone group in one molecule.

Examples of the water-soluble ketone-based solvent include acetone, methyl ethyl ketone, and cyclohexanone. Among these, the water-soluble ketone-based solvent is, for example, preferably acetone.

The water-soluble alcohol-based solvent is a water-soluble solvent having an alcoholic hydroxyl group in one molecule.

Examples of the water-soluble alcohol-based solvent include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2- propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these, preferred as the water-soluble alcohol-based solvent are, for example, methanol, ethanol, 2-propanol, ethylene glycol, ethylene glycol monoalkyl ether, propylene glycol, propylene glycol monoalkyl ether, diethylene glycol, and diethylene glycol monoalkyl ether.

The other water-soluble organic solvents may be used alone or in combination of two or more kinds thereof.

The other water-soluble organic solvent may have, for example, a boiling point of 270° C. or lower, preferably 60° C. or higher and 250° C. or lower, and more preferably 80° C. or higher and 230° C. or lower. In a case where the boiling point of the water-soluble organic solvent is within the above range, the water-soluble organic solvent is less likely to remain in the porous polyimide film, and a porous polyimide film having high mechanical strength can be easily obtained.

Organic Solvent

The organic solvent contains an organic solvent. The content of the organic solvent in the with respect to the entire aqueous solvent is, for example, preferably 50% by mass or more and 100% by mass or less, more preferably 70% by mass or more and 100% by mass or less, and still more preferably 80% by mass or more and 100% by mass or less.

Examples of the organic solvent contained in the organic solvent include an aprotic polar solvent. The aprotic polar solvent is a solvent having a boiling point of 150° C. or higher and 300° C. or lower and a dipole moment of 3.0 D or higher and 5.0 D or lower. Specific examples of the aprotic polar solvent include N-methyl-2-pyrrolidone (NMP), N,N-dimethylformamide (DMF), 1,3-dimethyl-2-imidazolidinone (DMI), N,N-dimethylacetamide (DMAc), dimethyl sulfoxide (DMSO), hexamethylene phosphoramide (HMPA), N-methylcaprolactam, N-acetyl-2-pyrrolidone, N,N'-dimethylpropylene urea, tetramethylurea, trimethyl phosphate, and triethyl phosphate.

Among these, for example, preferred examples of the organic solvent contained in the organic solvent include N-methyl-2-pyrrolidone (NMP), N-isopropylacrylamide (NIPAM), and N,N-dimethylacetamide (DMAc).

The content of the solvent is, for example, preferably 75% by mass or more, and more preferably 80% by mass or more, with respect to the total mass of the polyimide precursor solution.

Other Additives

The polyimide precursor solution according to the present exemplary embodiment may include a catalyst for accelerating the imidization reaction, a leveling agent for improving film quality, or the like as other additives as necessary.

The catalyst for accelerating the imidization reaction used may be a dehydrating agent such as an acid anhydride, an acid catalyst such as a phenol derivative, a sulfonic acid derivative, a benzoic acid derivative, or the like.

Further, the polyimide precursor solution according to the present exemplary embodiment may contain, for example, a conductive material (conductive (for example, a volume resistivity of less than $10^7$ Ω·cm) or semiconductive material (for example, a volume resistivity of $10^7$ Ω·cm or more and $10^{13}$ Ω·cm or less)) as a conductive agent to be added for imparting conductivity, depending on the purpose of use of the porous polyimide film.

Examples of the conductive agent include carbon black (for example, acidic carbon black having a pH of 5.0 or less); metals (for example, aluminum or nickel); metal oxides (for example, yttrium oxide, or tin oxide); ion conductive materials (for example, potassium titanate, or LiCl); and the like.

These conductive agents may be used alone or in combination of two or more.

Further, the polyimide precursor solution according to the present exemplary embodiment may contain $LiCoO_2$, $LiMn_2O$, and the like used as electrodes of a lithium ion battery.

Further, the polyimide precursor solution according to the present exemplary embodiment may contain inorganic particles added for improving mechanical strength, depending on the purpose of use. Examples of the inorganic particles include particulate materials such as silica powder, alumina powder, barium sulfate powder, titanium oxide powder, mica, and talc.

Method for Producing Polyimide Precursor Solution

The method for producing the polyimide precursor solution is not particularly limited, and examples thereof include a production method including a resin particle dispersion preparation step of preparing a resin particle dispersion and a polyimide precursor forming step of forming a polyimide precursor.

Resin Particle Dispersion Preparation Step

The method of the resin particle dispersion preparation step is not particularly limited as long as a resin particle dispersion in which resin particles are dispersed in a solvent can be obtained.

Examples thereof include a method of weighing the resin particles that do not dissolve in the polyimide precursor solution, and the solvent for the resin particle dispersion solution and then mixing and stirring the resin particles and the solvent. The method of mixing and stirring the resin particles and the solvent is not particularly limited. Example thereof include a method of mixing the resin particles while stirring the solvent. Further, from the viewpoint of enhancing the dispersibility of the resin particles, at least one selected from the group consisting of an ionic surfactant and a nonionic surfactant may be contained in the resin particle dispersion.

Further, the resin particle dispersion may be a resin particle dispersion in which resin particles are granulated in the solvent. The method of granulating the resin particles in the solvent is as described above.

In the resin particle dispersion forming step, a commercially available resin particle dispersion dispersed in a solvent may be prepared without being limited to the method described above. Further, in a case where a commercially available resin particle dispersion is used, an operation such as dilution with a solvent may be performed depending on the purpose. In a case where an aqueous solvent is used as the solvent, the organic solvent of the resin particle dispersion dispersed in the organic solvent may be replaced with the aqueous solvent.

Polyimide Precursor Forming Step

In the polyimide precursor forming step, for example, a tetracarboxylic dianhydride and a diamine compound are polymerized in a dispersion in which resin particles are dispersed to generate a resin (polyimide precursor), thereby obtaining a polyimide precursor solution. In a case where an aqueous solvent is used as the solvent, the above polymerization may be carried out in the presence of an organic amine compound.

According to this method, since the solvent used in the polyimide precursor solution is applied, the productivity is high, and since the polyimide precursor solution is produced in one stage, this method is advantageous in terms of simplification of the process.

Specifically, for example, in a case where an aqueous solvent is used as the solvent, an organic amine compound, a tetracarboxylic dianhydride, and a diamine compound are mixed with the dispersion in which the resin particles prepared in the resin particle dispersion preparation step are dispersed. Then, tetracarboxylic dianhydride and the diamine compound are polymerized in the presence of the organic amine compound to form a polyimide precursor in the resin particle dispersion. The order of mixing the organic amine compound, the tetracarboxylic dianhydride, and the diamine compound in the resin particle dispersion is not particularly limited.

In a case where the tetracarboxylic dianhydride and the diamine compound are polymerized in the resin particle dispersion in which the resin particles are dispersed, the polyimide precursor may be formed by using the solvent in the resin particle dispersion as it is. Further, a solvent may be newly mixed as necessary. Further, other additives may be mixed depending on the purpose.

The formation of the polyimide precursor may be performed by polymerizing a tetracarboxylic dianhydride and a diamine compound in an organic solvent such as an aprotic polar solvent (for example, N-methylpyrrolidone (NMP)) to generate a resin (polyimide precursor). In a case where an aqueous solvent is used as the solvent of the polyimide precursor solution, for example, after the polyimide precursor is produced, a solution in which the polyimide precursor is dissolved in an organic solvent may be added to the resin particle dispersion obtained in the resin particle dispersion forming step to precipitate the resin (polyimide precursor), and then the polyimide precursor may be dissolved in the aqueous solvent by, for example, addition of an organic amine compound.

By the above steps, a polyimide precursor solution in which resin particles are dispersed can be obtained.

Method for Producing a Porous Polyimide Film

The method for producing a porous polyimide film according to the present exemplary embodiment includes a first step of applying the polyimide precursor solution described above on a substrate to form a coating film and then drying the coating film to form a film containing the polyimide precursor and the resin particles, and a second step of heating the film to imidize the polyimide precursor to form a polyimide film, the second step including a process of removing the resin particles.

Hereinafter, an example of a method for producing a porous polyimide film according to the present exemplary embodiment will be described with reference to the drawings.

FIG. 1 is a schematic view showing a structure of a porous polyimide film obtained by the method for producing a porous polyimide film according to the present exemplary embodiment.

In the reference numerals in FIG. 1, 31 represents a substrate, 51 represents a release layer, 10A represents pores, and 10 represents a porous polyimide film.

First Step

In the first step, the polyimide precursor solution described above is applied onto a substrate to form a coating film, and then the coating film is dried to form a film containing the polyimide precursor and the resin particles.

The coating film is formed by applying the polyimide precursor solution obtained by the above-described method onto a substrate. The resulting coating film contains at least a polyimide precursor, resin particles, and a solvent. Also, the resin particles in the coating film are distributed in a state where aggregation is suppressed.

The substrate to which the polyimide precursor solution is applied (the substrate 31 in FIG. 1) is not particularly limited.

Examples of the substrate include resin substrates such as polystyrene and polyethylene terephthalate; glass substrates; ceramic substrates; metal substrates such as iron and stainless steel (SUS); and composite material substrates in which these materials are combined.

Further, as necessary, the substrate may be provided with a release layer (release layer 51 in FIG. 1) by performing a release treatment with, for example, a silicone-based or fluorine-based release agent. It is also effective to roughen the surface of the base material to a size of about the particle size of the particles to promote the exposure of the particles on the base material contact surface.

The method for applying the polyimide precursor solution on the substrate is not particularly limited, and examples thereof include various methods such as a spray coating method, a spin coating method, a roll coating method, a bar coating method, a slit die coating method, and an inkjet coating method.

As the base material, various base materials may be used depending on the intended application. Examples of the base material include various base materials applied to a liquid crystal element; a semiconductor base material on which an integrated circuit is formed, a wiring base material on which wiring is formed, a base material of a printed circuit board on which an electronic component and wiring are provided; and a base material for an electric wire coating material.

The coating film is formed by drying the coating film formed on the substrate. The film contains at least a polyimide precursor and resin particles.

The method for drying the coating film formed on the substrate is not particularly limited, and examples thereof include various methods such as heat drying, natural drying, and vacuum drying.

More specifically, the film is preferably, for example, formed by drying the coating film so that the solvent remaining in the film is 50% by mass or less (for example, preferably 30% by mass or less), with respect to the solid content of the film.

A treatment for exposing the resin particles may be performed in the process of drying to form a film. By performing the treatment for exposing the resin particles, the porosity of the porous polyimide film can be increased.

Specific examples of the treatment for exposing the resin particles include the methods shown below.

In the process of drying the coating film to form a coating film containing the polyimide precursor, and the resin particles, the polyimide precursor in the formed coating film is in a state capable of being dissolved in water as described above. Therefore, resin particles is exposed from the film by, for example, a treatment of wiping the film with water or a treatment of immersing the film in water. More specifically, for example, by performing the treatment of wiping the surface of the film with water to expose the resin particles, the polyimide precursor (and solvents) coated with the resin particles is removed. As a result, resin particles are exposed on the surface of the treated film.

In particular, in a case where a film in which resin particles are buried is formed, it is preferable to employ, for example, the above treatment as a treatment for exposing resin particles buried in the film.

Second Step

The second step is a step of heating the film obtained in the first step to imidize the polyimide precursor to form a polyimide film, and includes a process of removing the resin particles.

In the second step, specifically, the polyimide film is formed by heating the film obtained in the first step and advancing imidization. As the imidization progresses and the imidization rate increases, the polyimide film becomes difficult to dissolve in a solvent.

In the second step, for heating to imidize the polyimide precursor in the film, for example, heating in two or more stages is preferably used. Specifically, for example, the following heating conditions are adopted.

As the heating condition of the first stage, for example, it is desirable that the temperature is such that the shape of the resin particles is maintained. Specifically, for example, the heating temperature in the first stage may be in the range of 50° C. or higher and 150° C. or lower, preferably in the range of 60° C. or higher and 140° C. or lower. The heating time in the first stage is preferably in the range of 10 minutes or more and 60 minutes or less, for example. The higher the heating temperature in the first stage, the shorter the heating time in the first stage may be.

Examples of the heating conditions of the second stage include heating at 150° C. or higher and 450° C. or lower (preferably 200° C. or higher and 400° C. or lower) for 20 minutes or longer and 120 minutes or shorter. By setting the heating conditions in this range, the imidization reaction further proceeds. During the heating reaction, the temperature is, for example, preferably increased in stages or gradually at a constant rate before the final temperature of heating is reached.

The heating conditions are not limited to the above two-stage heating method, and for example, a one-stage heating method may be adopted. In the case of the one-stage heating method, for example, the imidization may be completed only by the heating conditions shown in the above second stage.

In the second step, in addition to the imidization by heating, the resin particles are removed from the film obtained in the first step or the polyimide film obtained by the imidization. By removing the resin particles, the region where the resin particles existed becomes pores (pores 10A in FIG. 1), and a porous polyimide film (porous polyimide film 10 in FIG. 1) is obtained.

The removal of the resin particles may be performed, for example, in the process of imidizing the polyimide precursor with respect to the film obtained in the first step, or may be performed after the imidization is completed (after imidization).

Examples of the method of removing the resin particles from the film include a method of decomposing and removing the resin particles by heating, a method of removing the particles by dissolving the resin particles with an organic solvent, and a method of removing the resin particles by decomposition with a laser or the like.

In the case of using the method of decomposing and removing the resin particles by heating, the method may also serve as the imidization described above. That is, the resin particles may be removed by heating in the imidization.

These methods may be performed by only one method or may be used in combination of two or more methods.

In the case of the method of decomposing and removing the resin particles by heating, for example, it is preferable to heat at a temperature equal to or higher than the melting temperature of the resin particles.

Examples of the method for removing the resin particles by dissolving the resin particles in an organic solvent include a method of removing the resin particles by dissolving resin particles in an organic solvent by bringing a film or a polyimide film into contact with the organic solvent.

Examples of the method for bringing the film or the polyimide film into contact with the organic solvent include a method for immersing the coating film or the polyimide film in the organic solvent, a method for applying the organic solvent to the film or the polyimide film, and a method for bringing the film or the polyimide film into contact with the organic solvent vapor.

The organic solvent that dissolves the resin particles is not particularly limited as long as the organic solvent does not dissolve the polyimide precursor and the polyimide and can dissolve the resin particles.

The organic solvent used may be, for example, ethers such as tetrahydrofuran and 1,4-dioxane; aromatic compounds such as benzene and toluene; ketones such as acetone; and esters such as ethyl acetate.

Among these, for example, preferred organic solvents include ethers such as tetrahydrofuran and 1,4-dioxane; and aromatics such as benzene and toluene, and among these, more preferred organic solvents include tetrahydrofuran and toluene.

In the case of dissolving and removing the resin particles with an organic solvent, for example, the method is preferably performed, for example, when the imidization rate of the polyimide precursor in the film is 10% or more from the viewpoint of improving the removability of resin particles and from the viewpoint of preventing the film itself from dissolving in the organic solvent.

Examples of the method for setting the imidization rate to 10% or more include a method of heating under the heating conditions of the first stage in the imidization of the second step.

That is, for example, it is preferable to remove the resin particles in the film by dissolving the resin particles with an organic solvent after performing the heating in the first stage in the imidization of the second step.

Here, the imidization rate of the polyimide precursor will be described.

Examples of the partially imidized polyimide precursor include precursors having a structure having a repeating unit represented by the following general formula (I-1), the following general formula (I-2), or the following general formula (I-3).

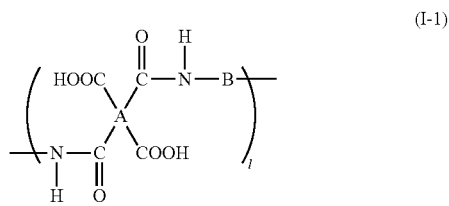

(I-1)

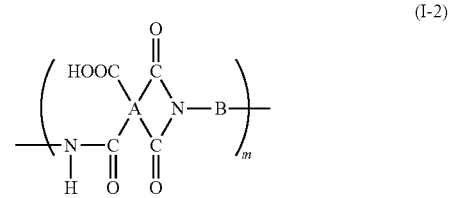

(I-2)

-continued

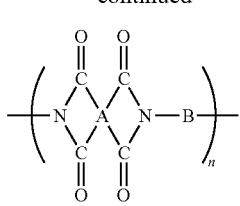

(I-3)

In the general formula (I-1), the general formula (I-2), and the general formula (I-3), A represents a tetravalent organic group and B represents a divalent organic group. 1 represents an integer of 1 or more, and m and n each independently represent 0 or an integer of 1 or more.

Note that A and B are synonymous with A and B in the general formula (I) described above.

The imidization rate of the polyimide precursor represents the ratio of the number of imide-closed bonds (2n+m) to the total number of bonds (2l+2m+2n) in the bonds of the polyimide precursor (reaction portion of tetracarboxylic dianhydride and diamine compound). That is, the imidization rate of the polyimide precursor is represented by "(2n+m)/(2l+2m+2n)".

The imidization rate (value of "(2n+m)/(2l+2m+2n)") of the polyimide precursor is measured by the following method.

Measurement of Imidization Rate of Polyimide Precursor
Preparation of Polyimide Precursor Sample
 (i) The polyimide precursor solution to be measured is applied onto a silicon wafer in a film thickness range of 1 μm or more and 10 μm or less to prepare a coating film sample.
 (ii) The coating film sample is immersed in tetrahydrofuran (THF) for 20 minutes to replace the solvent in the coating film sample with tetrahydrofuran (THF). The solvent to be immersed is not limited to THF, and is selected from a solvent that does not dissolve the polyimide precursor and can be miscible with the solvent component contained in the polyimide precursor solution. Specifically, alcohol solvents such as methanol and ethanol, and ether compounds such as dioxane is used.
 (iii) The coating film sample is taken out from the THF, and $N_2$ gas is blown to the THF adhered to the surface of the coating film sample to remove the sample. Under a reduced pressure of 10 mmHg or less, the coating film sample is dried for 12 hours or more in the range of 5° C. or more and 25° C. or less to prepare a polyimide precursor sample.
Preparation of 100% Imidized Standard Sample
 (iv) In the same manner as in (i) above, the polyimide precursor solution to be measured is applied onto a silicon wafer to prepare a coating film sample.
 (v) The coating film sample is heated at 380° C. for 60 minutes to perform an imidization reaction to prepare a 100% imidized standard sample.
Measurement and Analysis
 (vi) Using a Fourier transform infrared spectrophotometer (FT-730 manufactured by Horiba Seisakusho), the infrared absorption spectra of the 100% imidized standard sample and the polyimide precursor sample are measured. The ratio I'(100) of the absorption peak derived from the imide bond near 1780 cm$^{-1}$ (Ab'(1780 cm$^{-1}$)) to the absorption peak derived from the aromatic ring near 1500 cm$^{-1}$ (Ab'(1500 cm$^{-1}$)) of the 100% imidized standard sample is determined.
 (vii) Similarly, the polyimide precursor sample is measured, and the ratio I(x) of the absorption peak derived from the imide bond near 1780 cm$^{-1}$ (Ab(1780 cm$^{-1}$)) to the absorption peak derived from the aromatic ring near 1500 cm$^{-1}$ (Ab(1500 cm$^{-1}$)) is determined.

Then, the measured absorption peaks I'(100) and I(x) are used to calculate the imidization rate of the polyimide precursor based on the following formula.

imidization rate of polyimide precursor=$I(x)/I'(100)$   Formula:

$I'(100)=(Ab'(1780\ cm^{-1}))/(Ab'(1500\ cm^{-1}))$   Formula:

$I(x)=(Ab(1780\ cm^{-1}))/(Ab(1500\ cm^{-1}))$   Formula:

The measurement of the imidization rate of this polyimide precursor is applied to the measurement of the imidization rate of the aromatic polyimide precursor. In the case of measuring the imidization rate of the aliphatic polyimide precursor, a peak derived from a structure that does not change before and after the imidization reaction is used as an internal standard peak instead of the absorption peak of the aromatic ring.

The substrate used in the first step may be peeled from the film after the first step, may be peeled from the polyimide film before removing the particles in the second step, or may be peeled from the porous polyimide film obtained after the second step.

As described above, the porous polyimide film is produced.

Porous Polyimide Film

The porous polyimide film obtained by the method for producing a porous polyimide film according to the present exemplary embodiment has a pore diameter close to a target diameter.

The porosity of the porous polyimide film is not particularly limited. The porosity of the porous polyimide film is, for example, preferably 30% or more, preferably 40% or more, and more preferably 50% or more. The upper limit of the porosity is not particularly limited, and the porosity may be in the range of 90% or less.

Here, the porosity of the porous polyimide film is obtained from the apparent density and the true density of the porous polyimide film.

The apparent density d is a value obtained by dividing the mass (g) of the porous polyimide film by the volume (cm$^3$) of the porous polyimide film including pores. The apparent density d may be obtained by dividing the mass (g/m$^2$) per unit area of the porous polyimide film by the thickness (μm) of the porous polyimide film.

The true density p is a value obtained by dividing the mass (g) of the porous polyimide film by the volume (cm$^3$) of the porous polyimide film excluding pores (that is, the volume of only the skeleton portion made of resin).

The porosity of the porous polyimide film is calculated by the following equation (II).

Porosity (%)=$\{1-(d/\rho)\}\times 100=[1-\{(w/t)/\rho)\}]\times 100$   Equation (II)

d: Apparent density of porous polyimide film (g/cm$^3$)
ρ: True density of porous polyimide film (g/cm$^3$)
w: Mass per unit area of porous polyimide film (g/m$^2$)
t: Thickness of porous polyimide film (μm)

The shape of the pores is preferably, for example, a spherical shape or a shape close to a spherical shape. Further, the pores are preferably in a shape in which the pores are connected to each other and connected to each other, for example.

Examples of the average value of the pore diameter include a range of 0.05 µm or more and 100 nm or less, and may be a range of 0.3 µm or more and 50 µm or less, or a range of 0.5 µm or more and 10 µm or less.

The average value of the pore diameter is a value observed and measured by a scanning electron microscope (SEM). Specifically, first, a porous polyimide film is cut out in the thickness direction, and a measurement sample having the cut surface as the measurement surface is prepared. Then, the sample for measurement is observed and measured by VE SEM manufactured by KEYENCE Corporation using image processing software provided as a standard. The observation and measurement are performed 100 times for each of the pore portions in the cross-section of the measurement sample, the distribution of the pore diameters is obtained, and the average value of the pore diameters is obtained by averaging these values. In a case where the shape of the pores is not circular, the longest portion is defined as the diameter.

Average Film Thickness of Porous Polyimide Film

The average film thickness of the porous polyimide film produced by using the polyimide precursor solution according to the present exemplary embodiment is not particularly limited and is selected depending on the applications.

The average film thickness of the porous polyimide film may be, for example, 10 µm or more and 1000 µm or less. The average film thickness of the porous polyimide film may be 20 µm or more, 30 µm or more, and the average film thickness of the porous polyimide film may be 500 µm or less, or 400 µm or less.

The average film thickness of the porous polyimide film is calculated by the arithmetic average of the five points of the film thickness of the porous polyimide film measured using an eddy current thickness meter CTR-1500E manufactured by Sanko Electronics.

Applications of Porous Polyimide Film

Examples of applications to which the porous polyimide film according to the present exemplary embodiment is applied include a battery separator for a lithium battery and the like; a separator for an electrolytic capacitor; an electrolyte membrane such as a fuel cell; a battery electrode material; a gas or liquid separation membrane; a low dielectric constant material; and a filtration membrane.

EXAMPLES

Examples will be described below, but the present invention is not limited to these examples. In the following description, all "parts" and "%" are based on mass unless otherwise specified.

Example A

Preparation of Resin Particle Dispersion (A1)

50 parts by mass of styrene, 50 parts by mass of butyl acrylate, and 60 parts by mass of ion-exchanged water are mixed, and the mixture are stirred and emulsified for 30 minutes at 1,500 rpm with a dissolver to prepare a monomer emulsion. Subsequently, 1.10 parts by mass of Dowfax2A1 (47% solution, manufactured by Dow Chemical Co., Ltd.) and 42 parts by mass of ion-exchanged water are charged into the reaction vessel. After heating to 75° C. under a nitrogen stream, 75 parts by mass of the monomer emulsion is added. Thereafter, a polymerization initiator solution in which 15 parts by mass of ammonium persulfate is dissolved in 98 parts by mass of ion-exchanged water is added dropwise over 10 minutes. After reacting for 50 minutes after dropping, the remaining monomer emulsion is added dropwise over 220 minutes, reacted for another 180 minutes, and then cooled to obtain a core particle dispersion (A1) which is a dispersion of styrene/acrylic resin particles serving as core particles. The solid content concentration of the core particle dispersion (A1) is 33.7% by mass. Further, the volume-average particle size of the particles of this core is 0.39 µm. The ratio of monomers having a hydroxyl group ("hydroxyl group ratio" in Table 1) and the ratio of polyfunctional monomers ("polyfunctional group ratio" in Table 1) to the all of the monomers used for the production of the core are shown in Table 1.

To the obtained core particle dispersion (A1), 5.9 parts by mass of methylated melamine (manufactured by Sanwa Chemical Co., Ltd., NIKALAC MX-035 (70% aqueous solution of melamine)) as a compound having a melamine structure is added, and 10 parts by mass of acetic acid is further added to adjust the pH of the dispersion to 6, and the mixture is heated at 70° C. for 5 hours. As a result, a resin particle dispersion (A1) which is a dispersion of resin particles having a coating resin layer made of melamine resin on the particle surface of the core is obtained.

The solid content concentration of the resin particle dispersion (A1) is 33.3% by mass, and the volume-average particle size of the resin particles measured by the method described above is 0.43 µm.

The ratio of the coating resin layer with respect to the all of the resin particles ("coating resin ratio" in Table 1), and the results of obtaining the swelling degree after immersing the resin particles in methanol for 1 hour by the method described above ("swelling degree" in Table 1) are shown in Table 1.

Preparation of Resin Particle Dispersion (A2)

50 parts by mass of styrene, 40 parts by mass of butyl acrylate, 10 parts by mass of hydroxybutyl acrylate which is a monomer having a hydroxyl group, and 60 parts by mass of ion-exchanged water are mixed, stirred and emulsified for 30 minutes at 1,500 rpm by a dissolver to prepare a monomer emulsion. Subsequently, 1.10 parts by mass of Dowfax2A1 (47% solution, manufactured by Dow Chemical Co., Ltd.) and 42 parts by mass of ion-exchanged water are charged into the reaction vessel. After heating to 75° C. under a nitrogen stream, 75 parts by mass of the monomer emulsion is added. Thereafter, a polymerization initiator solution in which 15 parts by mass of ammonium persulfate is dissolved in 98 parts by mass of ion-exchanged water is added dropwise over 10 minutes. After reacting for 50 minutes after dropping, the remaining monomer emulsion is added dropwise over 220 minutes, reacted for another 180 minutes, and then cooled to obtain a core particle dispersion (A2) which is a dispersion of styrene/acrylic resin particles serving as core particles. The solid content concentration of the core particle dispersion (A2) is 34.2% by mass. Further, the volume-average particle size of the particles of this core is 0.39 µm. The ratio of monomers having a hydroxyl group ("hydroxyl group ratio" in Table 1) and the ratio of polyfunctional monomers ("polyfunctional group ratio" in Table 1) to the all of the monomers used for the production of the core are shown in Table 1.

To the obtained core particle dispersion (A2), 5.9 parts by mass of methylated melamine (manufactured by Sanwa Chemical Co., Ltd., NIKALAC MX-035 (70% aqueous solution of melamine) as a compound having a melamine structure is added, and 15 parts by mass of acetic acid is further added to adjust the pH of the dispersion to 6, and the mixture is heated at 70° C. for 5 hours. As a result, a resin particle dispersion (A2) which is a dispersion of resin particles having a coating resin layer made of melamine resin on the particle surface of the core is obtained.

The solid content concentration of the resin particle dispersion (A2) is 33.5% by mass, and the volume-average particle size of the resin particles measured by the method described above is 0.46 μm.

The ratio of the coating resin layer with respect to the all of the resin particles ("coating resin ratio" in Table 1), and the results of obtaining the swelling degree after immersing the resin particles in methanol for 1 hour by the method described above ("swelling degree" in Table 1) are shown in Table 1.

Preparation of Resin Particle Dispersion (A3)

To the core particle dispersion (A2), 3.0 parts by mass of methylated melamine (manufactured by Sanwa Chemical Co., Ltd., NIKALAC MX-035 (70% aqueous solution of melamine) as a compound having a melamine structure is added, and 5 parts by mass of acetic acid is further added to adjust the pH of the dispersion to 6, and the mixture is heated at 70° C. for 5 hours. As a result, a resin particle dispersion (A3) which is a dispersion of resin particles having a coating resin layer made of melamine resin on the particle surface of the core is obtained.

The solid content concentration of the resin particle dispersion (A3) is 34.1% by mass, and the volume-average particle size of the resin particles measured by the method described above is 0.44 μm.

The ratio of the coating resin layer with respect to the all of the resin particles ("coating resin ratio" in Table 1), and the results of obtaining the swelling degree after immersing the resin particles in methanol for 1 hour by the method described above ("swelling degree" in Table 1) are shown in Table 1.

Preparation of Resin Particle Dispersion (A4)

To the core particle dispersion (A2), 7.9 parts by mass of methylated melamine (manufactured by Sanwa Chemical Co., Ltd., NIKALAC MX-035 (70% aqueous solution of melamine) as a compound having a melamine structure is added, and 13.3 parts by mass of acetic acid is further added to adjust the pH of the dispersion to 6, and the mixture is heated at 70° C. for 5 hours. As a result, a resin particle dispersion (A4) which is a dispersion of resin particles having a coating resin layer made of melamine resin on the particle surface of the core is obtained.

The solid content concentration of the resin particle dispersion (A4) is 33.1% by mass, and the volume-average particle size of the resin particles measured by the method described above is 0.49 μm.

The ratio of the coating resin layer with respect to the all of the resin particles ("coating resin ratio" in Table 1), and the results of obtaining the swelling degree after immersing the resin particles in methanol for 1 hour by the method described above ("swelling degree" in Table 1) are shown in Table 1.

Preparation of Resin Particle Dispersion (A5)

To the core particle dispersion (A2), 12 parts by mass of methylated melamine (manufactured by Sanwa Chemical Co., Ltd., NIKALAC MX-035 (70% aqueous solution of melamine) as a compound having a melamine structure is added, and 20 parts by mass of acetic acid is further added to adjust the pH of the dispersion to 6, and the mixture is heated at 70° C. for 5 hours. As a result, a resin particle dispersion (A5) which is a dispersion of resin particles having a coating resin layer made of melamine resin on the particle surface of the core is obtained.

The solid content concentration of the resin particle dispersion (A5) is 33.0% by mass, and the volume-average particle size of the resin particles measured by the method described above is 0.53 μm.

The ratio of the coating resin layer with respect to the all of the resin particles ("coating resin ratio" in Table 1), and the results of obtaining the swelling degree after immersing the resin particles in methanol for 1 hour by the method described above ("swelling degree" in Table 1) are shown in Table 1.

Preparation of Resin Particle Dispersion (A6)

A core particle dispersion (A6) is obtained in the same manner as the core particle dispersion (A2) except that the amount of Dowfax2A1 added is changed from 1.10 parts by mass to 1.5 parts by mass. The solid content concentration of the core particle dispersion (A6) is 34.4% by mass. Further, the volume-average particle size of the core particles is 200 nm. The ratio of monomers having a hydroxyl group ("hydroxyl group ratio" in Table 1) and the ratio of polyfunctional monomers ("polyfunctional group ratio" in Table 1) to the all of the monomers used for the production of the core are shown in Table 1.

To the obtained core particle dispersion (A6), 5.9 parts by mass of methylated melamine (manufactured by Sanwa Chemical Co., Ltd., NIKALAC MX-035 (70% aqueous solution of melamine)) as a compound having a melamine structure is added, and 10 parts by mass of acetic acid is further added to adjust the pH of the dispersion to 6, and the mixture is heated at 70° C. for 5 hours. As a result, a resin particle dispersion (A6) which is a dispersion of resin particles having a coating resin layer made of melamine resin on the particle surface of the core is obtained.

The solid content concentration of the resin particle dispersion (A6) is 32.5% by mass, and the volume-average particle size of the resin particles measured by the method described above is 0.23 μm.

The ratio of the coating resin layer with respect to the all of the resin particles ("coating resin ratio" in Table 1), and the results of obtaining the swelling degree after immersing the resin particles in methanol for 1 hour by the method described above ("swelling degree" in Table 1) are shown in Table 1.

Preparation of Resin Particle Dispersion (CA1)

50 parts by mass of styrene, 40 parts by mass of butyl acrylate, 10 parts by mass of trimethylolpropane triacrylate which is a polyfunctional monomer, and 60 parts by mass of ion-exchanged water are mixed, stirred and emulsified for 30 minutes at 1,500 rpm by a dissolver to prepare a monomer emulsion. Subsequently, 1.10 parts by mass of Dowfax2A1 (47% solution, manufactured by Dow Chemical Co., Ltd.) and 40 parts by mass of ion-exchanged water are charged into the reaction vessel. After heating to 75° C. under a nitrogen stream, 75 parts by mass of the monomer emulsion is added. Thereafter, a polymerization initiator solution in which 15 parts by mass of ammonium persulfate is dissolved in 98 parts by mass of ion-exchanged water is added dropwise over 10 minutes. After reacting for 50 minutes after dropping, the remaining monomer emulsion is added dropwise over 220 minutes, reacted for another 180 minutes, and then cooled to obtain a resin particle dispersion (CA1) which is a dispersion of styrene/acrylic resin particles serving as core particles. The solid content concentration of the resin particle dispersion (CA1) is 34.4% by mass. Further, the volume-average particle size of the resin particles measured by the method described above is 0.39 μm. The ratio of monomers having a hydroxyl group ("hydroxyl group ratio" in Table 1) and the ratio of polyfunctional monomers ("polyfunctional group ratio" in Table 1) to all of the monomers used for the production of the core (that is, resin particle) are shown in Table 1.

Further, the results of obtaining the swelling degree after immersing the resin particles in methanol for 1 hour by the method described above ("swelling degree" in Table 1) are shown in Table 1.

Resin Particle Dispersion (CA2)

The core particle dispersion (A1) is used as it is as the resin particle dispersion (CA2). The results of obtaining the swelling degree after immersing the resin particles in methanol for 1 hour by the method described above ("swelling degree" in Table 1) are shown in Table 1.

Example A1

To resin particle dispersion (A1) containing 100 g of resin particles in terms of solid content (water: 191 g), 209 g of ion-exchanged water is added, and the solid content concentration of the resin particles is adjusted to 20% by mass. To this resin particle dispersion, 9.59 g (88.7 mmol) of p-phenylenediamine (molecular weight 108.14) and 25.58 g (86.9 mmol) of 3,3',4,4'-biphenyltetracarboxylic dianhydride (molecular weight 294.22) are added, and the mixture is dispersed by stirring at 20° C. for 10 minutes. Next, 25.0 g (247.3 mmol) of N-methylmorpholine (organic amine compound) is slowly added, and while the reaction temperature is maintained at 60° C., the mixture is dissolved and reacted by stirring for 24 hours, and further 25.0 g of N-methylpyrrolidone is added and stirred sufficiently to obtain a polyimide precursor solution (PAA-A1) in which resin particles are dispersed.

The ratio of water to the entire solvent contained in the obtained polyimide precursor solution (PAA-A1) is 95% by mass, and the ratio of the organic solvent is 5% by mass.

Examples A2 to A6, Comparative Examples A1 and A2

Polyimide precursor solutions (PAA-A2) to (PAA-A6) and (PAA-CA1) to (PAA-CA2) are obtained in the same manner as in Example A1, except that resin particle dispersions (A2) to (A6) and (CA1) to (CA2) are used instead of the resin particle dispersion (A1), respectively.

Evaluation of Change in Particle Size of Resin Particles Over Time in Polyimide Precursor Solution After the average particle size of the resin particles contained in the obtained polyimide precursor solution (before standing) is measured in advance, the polyimide precursor solution is allowed to stand at 40° C. for 30 days. Thereafter, the average particle size of the resin particles contained in the polyimide precursor solution after standing is measured.

The average particle size is defined as a particle size showing the highest content using a particle size distribution obtained by measurement with a laser diffraction particle size distribution analyzer (for example, LA-700 manufactured by Horiba, Ltd.) as a measurement apparatus for a polyimide precursor solution containing resin particles to be measured.

The measurement results of the average particle size (particle size before standing) of the resin particles contained in the polyimide precursor solution before standing and the measurement results of the average particle size (particle size after standing) of the resin particles contained in the polyimide precursor solution after standing are respectively shown in Table 1.

TABLE 1

| | Resin particle dispersion | Example A1 (A1) | Example A2 (A2) | Example A3 (A3) | Example A4 (A4) | Example A5 (A5) | Example A6 (A6) | Comparative Example A1 (CA1) | Comparative Example A2 (CA2) |
|---|---|---|---|---|---|---|---|---|---|
| Particles | coating resin layer ratio (% by mass) | 12.5 | 12.5 | 6.3 | 16.7 | 25 | 12.5 | 0 | 0 |
| | hydroxyl group ratio (% by mass) | 0 | 10 | 10 | 10 | 10 | 10 | 0 | 0 |
| | polyfunctional group ratio (% by mass) | 0 | 0 | 0 | 0 | 0 | 0 | 10 | 0 |
| | swelling degree (% by mass) | 5 | 4 | 8 | 3 | 1 | 2 | 3 | 21 |
| Evaluation | particle size before standing (μm) | 0.44 | 0.49 | 0.44 | 0.49 | 0.53 | 0.22 | 0.40 | 0.45 |
| | particle size after standing (μm) | 0.45 | 0.51 | 0.48 | 0.50 | 0.52 | 0.22 | 0.35 | aggregated |

Example B

Resin Particle Dispersion (B1)

Melamine resin-coated particles are produced in the same manner as the resin particle dispersion (A1). The melamine-coated particles are centrifuged at 2000 rpm for 10 minutes using a cooling high-speed centrifuge H923 (manufactured by KOKUSAN Co. Ltd.), and concentrated by removing the supernatant to obtain a slurry having a solid content concentration of 72%. A resin particle dispersion (B1) is obtained by adding 150 g of N-methylpyrrolidone to this slurry.

Resin Particle Dispersions (B2) to (B6), (CB1) to (CB2)

Resin particle dispersions (B2) to (B6) and (CB1) to (CB2) are obtained in the same manner as the resin particle dispersion (B1), except that resin particle dispersions (A2) to (A6) and (CA1) to (CA2) are used instead of the resin particle dispersion (A1) to prepare melamine resin-coated particles.

Example B1

To resin particle dispersion (B1) containing 100 g of resin particles in terms of solid content (solvent: 191 g), 200 g of NMP is added, and the solid content concentration of the resin particles is adjusted to 20% by mass. To this resin particle dispersion, 9.59 g of p-phenylenediamine and 25.58 g of 3,3',4,4'-biphenyltetracarboxylic dianhydride are added, and the mixture is dispersed by stirring at 20° C. for 10 minutes. Next, 25.0 g of N-methylmorpholine (organic amine compound) is slowly added, and while the reaction temperature is maintained at 60° C., the mixture is dissolved and reacted by stirring for 24 hours, and stirred sufficiently to obtain a polyimide precursor solution (PAA-B1) in which resin particles are dispersed.

The ratio of water to the entire solvent contained in the obtained polyimide precursor solution (PAA-B1) is 11% by mass, and the ratio of the organic solvent is 90% by mass.

Examples B2 to B6, Comparative Examples B1 to B2

Polyimide precursor solutions (PAA-B2) to (PAA-B6) and (PAA-CB1) to (PAA-CB2) are obtained in the same manner as in Example B1 except that the resin particle dispersions (B2) to (B6) and (CB1) to (CB2) are used instead of the resin particle dispersion (B1).

Evaluation of Change in Particle Size of Resin Particles Over Time in Polyimide Precursor Solution With respect to the obtained polyimide precursor solution, the average particle size (particle size before standing) of the resin particles contained in the polyimide precursor solution before standing and the average particle size (particle size after standing) of the resin particles contained in the polyimide precursor solution after standing for 30 days are measured in the same manner as in Example A. The results are shown in Table 2.

TABLE 2

| Resin particle dispersion | | Example B1 (B1) | Example B2 (B2) | Example B3 (B3) | Example B4 (B4) | Example B5 (B5) | Example B6 (B6) | Comparative Example B1 (CB1) | Comparative Example B2 (CB2) |
|---|---|---|---|---|---|---|---|---|---|
| Particles | coating resin layer ratio (% by mass) | 12.5 | 12.5 | 6.3 | 16.7 | 25.0 | 12.5 | 0 | 0 |
| | hydroxyl group ratio (% by mass) | 0 | 10 | 10 | 10 | 10 | 10 | 0 | 0 |
| | polyfunctional group ratio (% by mass) | 0 | 0 | 0 | 0 | 0 | 0 | 10 | 0 |
| | swelling degree (% by mass) | 5 | 4 | 8 | 3 | 1 | 2 | 3 | 21 |
| Evaluation | particle size before standing ($\mu$m) | 0.50 | 0.52 | 0.48 | 0.54 | 0.55 | 0.30 | 0.45 | dissolved |
| | particle size after standing ($\mu$m) | 0.51 | 0.50 | 0.48 | 0.55 | 0.54 | 0.31 | 0.31 | dissolved |

From the above results, it can be seen that in Examples, the change in particle size of the resin particles over time is suppressed as compared with Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor solution comprising:
   a polyimide precursor;
   resin particles having a core and a coating resin layer, the coating resin layer containing a melamine resin; and
   a solvent, wherein the solvent contains water, and a content of the water is 70% by mass or more with respect to the solvent.

2. The polyimide precursor solution according to claim 1, wherein a ratio of the coating resin layer is 1% by mass or more and 30% by mass or less with respect to all of the resin particles.

3. The polyimide precursor solution according to claim 2, wherein the ratio of the coating resin layer is 10% by mass or more and 20% by mass or less with respect to all of the resin particles.

4. A polyimide precursor solution according to claim 1, wherein the resin particles have a swelling degree within ±10% after immersion in methanol for 1 hour.

5. The polyimide precursor solution according to claim 1, wherein the solvent contains an organic solvent.

6. The polyimide precursor solution according to claim 2, wherein the solvent contains an organic solvent.

7. The polyimide precursor solution according to claim 3, wherein the solvent contains an organic solvent.

8. The polyimide precursor solution according to claim 4, wherein the solvent contains an organic solvent.

9. The polyimide precursor solution according to claim 1, wherein a volume-average particle size of the resin particles is 0.05 $\mu$m or more and 100 $\mu$m or less.

10. The polyimide precursor solution according to claim 1, wherein the resin particles contain a resin containing a hydroxyl group.

11. The polyimide precursor solution according to claim 10, wherein the resin containing a hydroxyl group includes at least one selected from the group consisting of a polystyrene resin, an acrylic resin, a methacrylic resin, an acrylate resin, a methacrylate resin, a styrene-acrylic resin, and a styrene-methacrylic resin.

12. A method for producing a porous polyimide film, comprising:
- applying the polyimide precursor solution according to claim 1 on a substrate to form a coating film, and then drying the coating film to form a film containing the polyimide precursor and the resin particles; and
- heating the film to imidize the polyimide precursor to form a polyimide film, and performing a process of removing the resin particles.

* * * * *